United States Patent [19]

Deer et al.

[11] 4,391,647

[45] Jul. 5, 1983

[54] SPACKELING COMPOSITION

[75] Inventors: Carmine A. Deer, Westfield; Frank G. Cacossa, Livingston, both of N.J.

[73] Assignee: Sand and Sea Corporation, Sarasota, Fla.

[21] Appl. No.: 280,308

[22] Filed: Jul. 6, 1981

[51] Int. Cl.³ .............. C04B 11/10; C04B 11/14; C04B 11/24

[52] U.S. Cl. .............. 106/115; 106/109; 106/111; 501/33

[58] Field of Search .............. 106/109, 110, 115, 111; 501/33, 34

[56] References Cited

U.S. PATENT DOCUMENTS

| | | | |
|---|---|---|---|
| 2,585,366 | 2/1952 | Bollaert et al. | 106/98 |
| 3,135,617 | 6/1964 | Newell | 106/98 |
| 3,183,107 | 5/1965 | Alford | 501/33 |
| 3,341,341 | 9/1967 | Corson et al. | 106/98 |
| 3,386,233 | 6/1968 | Wegwerth | 52/71 |
| 3,565,650 | 2/1971 | Cordon | 106/97 |
| 3,764,357 | 10/1973 | Bowles et al. | 106/90 |
| 3,782,985 | 1/1974 | Gebhardt | 106/97 |
| 3,867,156 | 2/1975 | Fukumoto et al. | 501/33 |
| 3,891,453 | 6/1975 | Williams | 106/115 |
| 3,955,992 | 5/1976 | Roberts | 106/98 |
| 3,975,320 | 8/1976 | Lane et al. | 106/109 |
| 4,002,482 | 1/1977 | Coenen | 501/33 |
| 4,031,684 | 6/1977 | Shibata | 106/98 |
| 4,043,827 | 8/1977 | Bernett | 106/92 |
| 4,058,405 | 11/1977 | Snyder et al. | 501/33 |
| 4,081,259 | 3/1978 | Bassin et al. | 501/33 |
| 4,086,098 | 4/1978 | Le Ruyet et al. | 106/110 |
| 4,135,940 | 1/1979 | Peltier | 106/118 |
| 4,143,202 | 3/1979 | Tseng et al. | 428/406 |
| 4,174,230 | 11/1979 | Hashimoto et al. | 106/109 |
| 4,287,103 | 9/1981 | Francis et al. | 106/109 |

FOREIGN PATENT DOCUMENTS

| | | | |
|---|---|---|---|
| 52-11222 | 1/1977 | Japan | 106/110 |
| 1105623 | 3/1968 | United Kingdom | 106/110 |

*Primary Examiner*—Gary P. Straub
*Attorney, Agent, or Firm*—Lerner, David, Littenberg, Krumholz & Mentlik

[57] ABSTRACT

A composition is disclosed for spackeling or joint compound or as a stucco composition including hollow silica particles. Also, disclosed is a preferred composition comprising the following components in the indicated proportions: from about 3 to about 7 parts by weight of latex binder, from about 0.3 to about 1.5 parts by weight of water retention agent, from about 25 to about 36 parts by weight of filler, and from about 1 to about 5 parts by weight of hollow silica particles, said hollow silica particles having an average diameter of from about 25 microns to about 100 microns and a density of from about 0.10 g/cc to about 0.20 g/cc.

9 Claims, No Drawings

SPACKELING COMPOSITION

FIELD OF THE INVENTION

The present invention relates to spackeling and joint compound or stucco compositions. More particularly, the present invention relates to asbestos-free compositions having good spackeling properties.

BACKGROUND OF THE INVENTION

Certain asbestos-free latex based spackeling compositions are known in the art. For example, Williams in U.S. Pat. No. 3,891,453 discloses one such asbestos-free spackeling composition including two types of clays, i.e., attapulgus clay and modified montmorillonite clay. Williams notes that in some instances, i.e., for the all-purpose grade, the clay or the colloid can be omitted and one of the sodium carboxymethyl cellulose (SCMC), the clay, or that the colloid can be omitted in making ready-mixed joint compound which is stored wet.

Others have disclosed portland cement mixtures including silica particles. For example, Newell et al. in U.S. Pat. No. 3,135,617 disclose a cement plaster having incorporated therein an exceedingly finely divided silica having a particle size of up to about 40 microns and preferably consisting of particles up to about 20 microns. The Newell et al. cement plasters are said to provide low shrinkage and enhance cohesiveness, thereby facilitating the even application of relatively thick coats, on vertical surfaces, without slippage.

Hollow glass beads are mentioned in Bowles et al. U.S. Pat. No. 3,764,357 as examples of inorganic light weight aggregates for use in light weight concrete and plaster prepared by wetting the surfaces of the particles of the light weight aggregate with an aqueous medium, and then admixing the particles of wet aggregate with finely divided cementitious material to coat the particles therewith.

Tseng et al. in U.S. Pat. No. 4,143,202 disclose cellular glass pellets which are said to be useful as light weight aggregate in matrices such as concrete, thermosetting and thermoplastic organic polymer bodies, metals, and gypsum and plaster materials.

SUMMARY OF THE INVENTION

It has now been found that a light weight composition having excellent spackeling properties can be provided by a composition including an effective amount of hollow silica particles to provide slip to said compound or composition, wherein the hollow silica particles have an average diameter of from about 25 microns to about 100 microns and a density of from about 0.10 g/cc to about 0.20 g/cc. The composition preferably comprises the following components in the indicated proportions from about 3 to about 7 parts of latex binder, from about 0.3 to about 1.5 parts of water retention agent, from about 25 to about 36 parts of filler, and from about 1 to about 5 parts of hollow particles, said hollow silica particles having an average diameter of from about 25 microns to about 100 microns and a density from about 0.10 grams/cc to about 0.20 grams/cc. Such a composition has been found to provide spackeling properties at least as good as commercial compositions now available. Moreover, because of the use of hollow silica particles, the spackeling composition is very light weight and provides less trowel drag and provides better non-leveling characteristics than presently available commercial spackeling compositions. Furthermore, the composition is suitable for use as a stucco material, for example, in refurbishing ceilings, and it provides fire-resistance and insulating values. Still further, the composition of the invention allows the elimination of one or both of the two clay materials normally included in asbestos-free spackeling compositions.

DETAILED DESCRIPTION OF THE INVENTION

As discussed above, in accordance with the present invention, excellent properties for spackeling and stucco are provided by a composition including an effective amount of hollow silica particles to provide slip to said compound or composition, wherein the hollow silica particles have an average diameter of from about 25 microns to about 100 microns and a density of from about 0.10 g/cc to about 0.20 g/cc. In a preferred embodiment of the invention such hollow silica particles are combined with the following other components in the indicated proportions: from about 3 to about 7 parts by weight of latex binder, from about 0.3 to about 1.5 parts by weight of water retention agent, from about 25 to about 36 parts by weight of filler, and from about 1 to about 5 parts by weight of the hollow silica particles. Preferably, the composition of the invention comprises the following proportions of components: from about 4.0 to about 5.5 parts by weight of latex binder, from about 0.5 to about 1.0 parts by weight of water retention agent, from about 33 to about 36 parts by weight of filler, and from about 3 to about 4.5 parts by weight of hollow silica particles.

The composition of the invention is usually mixed with water to form the composition which is actually used in spackeling or stuccoing walls or ceilings. Usually from about 30 to about 55 parts by weight of water is mixed with about 70 to about 45 parts by weight of the composition of the invention and preferably from about 40 to about 50 parts by weight of water is so mixed.

Suitable hollow silica particles for use in the present invention include those having an average diameter of from about 25 microns to about 100 microns, preferably, from about 35 to about 65 microns, and more preferably, from about 45 to about 55 microns. The particles should also have an average density of from about 0.10 to about 0.20 g/cc, and preferably, from about 0.12 to about 0.18 g/cc. The particles are preferably generally spherical in shape. Examples of such hollow silica particles include materials sold under the tradename Glass Bubbles by the Special Enterprise Department of 3M.

Any conventional filler used in the art in stucco and spackeling compositions can be employed in the present invention. Calcium carbonate, calcium sulfate, mica, talc and sericite are examples of suitable fillers. In many instances, a combination of fillers is employed in the composition of the invention. A particularly preferred combination of fillers is talc, mica and calcium carbonate.

Again, any of the conventional water retention agents can be employed in the present invention. Suitable water retention agents include sodium carboxymethyl cellulose (e.g., material sold under the tradenames CELLOSIZE and METHOCEL by Union Carbide and Dow Chemical, respectively), amine-modified montmorillonite (e.g., material sold under the tradename Bentone by NL Industries, Inc.), and xanthan gum. Preferred water retention agents are Methocel and Cellosize.

The present invention can also employ conventional binders, e.g., latex binders. Suitable binders include polyvinyl acetate, polyvinyl alcohol, starches and casein. Polyvinyl vinyl alcohol can be used to provide a dry mix. A preferred latex binder is a polyvinyl acetate sold under the tradename Ucar 131 by Union Carbide.

The composition of the invention can also further comprise attapulgus clay. This clay provides non-leveling and slip properties to the composition of the invention. When the composition of the invention includes such clay, the composition comprises the components described above in the indicated proportions along with from about 2 to about 6 parts by weight of such clay, and preferably, from about 3 to about 5 parts by weight of such clay. Suitable attapulgus clays for use in the composition of the invention include the material sold under the tradename ATTAGEL by Engelhardt.

A montmorillonite clay can also be included in the composition of the invention. Such clay also provides slip properties to the composition of the invention. Such a montmorillonite clay can be added to the composition of the invention in amounts of from about 0.5 to about 3 parts by weight, and preferably, from about 0.5 to about 2 parts by weight. A suitable montmorillonite clay includes the material sold under the tradename BENTONE by NL Industries Inc.

The composition of the invention can be formed by physically mixing the components of the composition, e.g., with a low shear mixer. The composition for actually spackeling or stuccoing walls or ceilings is formed by mixing the composition of the invention with water as described above. Such spackeling compositions can be used in the same manner as any of the spackeling and stucco compositions now commercially available.

The examples below are intended to illustrate, but not to limit, the present invention.

EXAMPLE 1

A spackeling composition in accordance with the present invention was prepared by mixing in a low shear mixer the following components in the indicated proportions.

| | Units (lbs) |
|---|---|
| Water | 55.0 |
| Tamol SN | 1.0 |
| (Surfactant sold by Rohm & Haas) | |
| Triton X-100 | 0.5 |
| (Surfactant sold by Rohm & Haas) | |
| Attagel | 4.0 |
| (sold by Engelhardt Industries) | |
| Methocel | 0.85 |
| (sold by Dow Chemical) | |
| Dowicil 75 | .005 |
| (anti-mold agent sold by Dow Chemical) | |
| Talc | 9.0 |
| Mica | 2.8 |
| Marble White | 32.0 |
| U CAR 131 | 5.0 |
| (PVA sold by Union Carbide) | |
| hollow silica particles (having an average diameter of about 52 microns and a density of about 15 g/cc sold by 3M under the tradename Glass Bubbles) | 4.5 |

This composition was found to have excellent adhesion to the spackeling knife, little or no trowel drag, good work ability, light weight, non-leveling properties, and good mixability with normal drying time and tape adhesion.

EXAMPLE 2

Another composition in accordance with the present invention was prepared as in Example 1 by mixing the following components in the indicated percentages by weight

| Item | percent |
|---|---|
| Water | 47.2% |
| Tamol SN | 0.9% |
| Triton X-100 | 0.5% |
| Attagel | 5.0% |
| Methocel | 0.8% |
| Dowicil 75 | 0.01% |
| Talc | 8.0% |
| Mica | 2.6% |
| Marble White | 29.99% |
| hollow silica particles | 4.2% |
| polyvinyl alcohol | 0.8% |

This composition exhibited excellent workability, slip, resistance to flow, good tape bonding and minimum cracking. This composition could be provided as a dry mix.

EXAMPLE 3

Still another composition of the invention was prepared as in Example 1 by mixing the following components in the indicated percentages by weight:

| Item | percent |
|---|---|
| Water | 50% |
| Tamol SN | .99% |
| Triton X-100 | .5% |
| Methocel | .8% |
| Dowicil | .01% |
| Talc | 8.8% |
| Mica | 2.7% |
| Marble White | 31.0% |
| hollow silica particles | 4.4% |
| polyvinyl alcohol | .8% |

This batch also had excellent characteristics similar to the composition of Example 2 as described above, with one exception. This batch was somewhat more adhesive than the composition of Example 2. This latter property could make for a better spackeling compound and stucco composition in instances where it is important to adhere to holes and crevices covered by this product.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. An non-leveling asbestos-free joint compound or stucco composition comprising the following components in the indicated proportions: from about 3 to about 7 parts by weight of binder selected from the group consisting of latex binder and polyvinyl alcohol; from about 0.3 to about 1.5 parts by weight of water retention agent; from about 25 to about 36 parts by weight of filler selected from the group consisting of calcium carbonate, calcium sulfate, mica, talc, sericite and mixtures thereof; and from about 1 to about 5 parts by weight of hollow silica particles, said hollow silica particles having an average diameter of from about 25 microns to about 100 microns and a density of from about 0.10 g/cc to about 0.20 g/cc.

2. An asbestos-free joint compound or stucco composition according to claim 1 comprising the following components in the indicated proportions: from about 4.0 to about 5.5 parts by weight of binder, from about 0.5 to about 1.0 parts by weight of water retention agent, from about 33 to about 36 parts by weight of filler, and from about 3 to about 4.5 parts by weight of said hollow silica particles.

3. A joint compound or stucco composition according to claim 1 or 2, wherein said silica particles have an average diameter of from about 35 microns to about 65 microns and a density of from about 0.12 g/cc to about 0.18 g/cc.

4. A joint compound or stucco composition according to claim 1 or 2, further comprising from about 30 to about 55 parts by weight of water in combination with about 70 to about 45 parts by weight of said composition.

5. A joint compound or stucco composition according to claim 1 or 2, further comprising from about 2 to about 6 parts by weight of attapulgus clay.

6. A joint compound or stucco composition according to claim 1 or 2, further comprising from about 0.5 to about 5 parts by weight of montmorillonite clay.

7. A joint compound or stucco composition according to claim 1 or 2, wherein said binder is polyvinyl alcohol.

8. A joint compound or stucco composition according to claim 1 or 2, wherein said water retention agent is sodium carboxymethyl cellulose.

9. A method for spackeling or stuccoing a wall or ceiling comprising applying to said wall or ceiling a non-leveling asbestos-free composition comprising the following components in the indicated proportions: from about 3 to 7 parts by weight of binder selected from the group consisting of latex binder and polyvinyl alcohol; from about 0.3 to about 1.5 parts by weight of water retention agent; from about 25 to about 36 parts by weight of filler selected from the group consisting of calcium carbonate, calcium sulfate, mica, talc, sericite, and mixtures thereof; from about 1 to about 5 parts by weight of hollow silica particles, said hollow silica particles having an average diameter of from about 25 microns to about 100 microns and a density of from about 0.10 g/cc to about 0.20 g/cc; and from about 30 to about 55 parts by weight water.

* * * * *